United States Patent [19]
Amano et al.

[11] Patent Number: 5,165,627
[45] Date of Patent: Nov. 24, 1992

[54] FUSELAGE WALL INNER LINING PLATE

[75] Inventors: Kanichi Amano, Tokyo; Kiyoshi Okura; Kazuo Izumiyama, both of Takasago; Katsuya Matsuzaki; Katsuhiko Shibata, both of Nagoya, all of Japan

[73] Assignees: Mitsubishi Jukogyo Kabushiki Kaisha; Japan Aircraft Development Corporation, both of Tokyo, Japan

[21] Appl. No.: 795,251

[22] Filed: Nov. 19, 1991

Related U.S. Application Data

[63] Continuation of Ser. No. 597,725, Oct. 17, 1990, abandoned.

[30] Foreign Application Priority Data

Oct. 17, 1989 [JP] Japan .............................. 1-120580[U]
Jun. 15, 1990 [JP] Japan .............................. 2-62679[U]

[51] Int. Cl.$^5$ ................................................ B64C 1/40
[52] U.S. Cl. .................................... 244/119; 244/123; 428/119
[58] Field of Search ............... 244/123, 124, 126, 119; 428/188, 35.7, 36.9

[56] References Cited

U.S. PATENT DOCUMENTS

| | | | |
|---|---|---|---|
| 2,069,413 | 2/1937 | Leadbetter | 244/119 X |
| 2,095,626 | 10/1937 | Bassett et al. | 244/119 X |
| 2,111,326 | 3/1938 | Norris | 244/119 X |
| 2,836,267 | 5/1953 | Reinhold . | |
| 3,995,080 | 11/1976 | Cogburn et al. | 244/123 X |
| 3,995,081 | 11/1976 | Fant et al. | 244/123 X |
| 4,198,018 | 4/1980 | Brault | 244/119 |

FOREIGN PATENT DOCUMENTS

| | | |
|---|---|---|
| 674433 | 4/1939 | Fed. Rep. of Germany . |
| 264546 | 2/1927 | United Kingdom . |
| 577705 | 6/1946 | United Kingdom . |

OTHER PUBLICATIONS

Koval, Leslie R., "Effect of Air Flow, Panel Curvature, and Internal Pressurization of Field-incidence Transmission Loss", *J. Acoust. Soc. Am.*, vol. 59, No. 6, Jun. 1976, pp. 1379-1385.

Koval, L. R., "On Sound Transmission into an Orthotropic Shell", *Journal of Sound and Vibration* 63(1), (1979), pp. 51-59.

Koval, Leslie R., "Sound Transmission Into a Laminated Composite Shell", *Journal of Sound and Vibration*, 71(4), (1980), pp. 523, 530.

*Primary Examiner*—Charles A. Marmor
*Assistant Examiner*—Carla Mattix
*Attorney, Agent, or Firm*—Wenderoth, Lind & Ponack

[57] ABSTRACT

The present invention is drawn to an improvement in the configuration of an inner lining plate of an aircraft fuselage wall, which will result in the sound transmission loss (TL) of the inner lining plate to occur in a frequency range covering the frequencies of external noises such as propeller sound, such that external noises transmitted from the inside of the aircraft fuselage can be reduced. The improvement resides in that a tensile rigidity in the circumferential direction of a substantially cylindrical fuselage wall inner lining plate is less than the tensile rigidity in the axial direction thereof. In this respect, the inner lining plate is provided with a large number of parallel crests extending in the axial direction. Alternatively, the substantially cylindrical fuselage wall inner lining plate can be made of fiber-reinforced plastics, in which fibers are woven in the axial direction in a mode different from that in which they are woven in the circumferential direction to provide an anisotropic property in which tensile rigidity in the circumferential direction is less than in the axial direction.

6 Claims, 6 Drawing Sheets

IN  OUT

IN  OUT

IN  OUT

IN  OUT

FUSELAGE WALL INNER LINING PLATE

This application is a continuation of now abandoned application Ser. No. 07/597,725 filed on Oct. 17, 1990, now abandoned.

BACKGROUND OF THE INVENTION

1. Field of the Invention:

The present invention relates to a fuselage wall inner lining plate that is available for use as an inside wall of the fuselage of an aircraft or the like.

2. Description of the Prior Art:

At first, one example of a fuselage wall structure in the prior art will be described with reference to FIGS. 12 and 13. FIG. 12 is a partial transverse cross-sectional view of a fuselage wall of an aircraft in the prior art taken along a plane perpendicular to a center axis of the aircraft, and FIG. 13 is a partial longitudinal cross-sectional view of the same fuselage wall taken along line Y—Y in FIG. 12. In these figures, reference symbol In designates an inner space of the fuselage, symbol Out designates an outer space of the fuselage, reference numeral 1 designates a fuselage wall inner lining plate having a cylindrical shape, numeral 2 designates a fuselage wall outside plate having a cylindrical shape, numeral 3 designates an annular reinforcement referred to as a "frame", numeral 4 designates another reinforcement extending in the longitudinal direction of the cylindrical fuselage and referred to as a "stringer", numeral 5 designates a damping member for damping vibrations propagating along the outside plate, and numeral 6 designates a sound absorbing material for increasing a sound transmission loss (or simply "transmission loss": hereinafter abbreviated as TL, represented in dB) of the fuselage wall. It is to be noted that the fuselage wall inner lining plate 1 comprises normally isotropic fiber-reinforced plastics or the like.

In a fuselage structure of aircraft in the prior art, the outside plate and the inner lining plate are both substantially cylindrical. The TL of a cylinder close to a ring frequency $f_R$ dependent upon the material and radius of the cylinder is lower compared to when a flat plate made of the same material is employed. FIG. 14 dramatically shows one example of such a comparison, in which at a ring frequency of $f_R = 350$ Hz the TL becomes minimal, and at frequencies close to this ring frequency the TL of a cylinder becomes lower than the TL of a flat plate.

In the case of a passenger plane, since the $f_R$ of an outside plate is normally 300–400 Hz and the $f_R$ of an inner lining plate is about 150–300 Hz, the TL of the fuselage wall consisting of the outside plate and the inner lining plate is, as a whole, within the frequency range of 100–500 Hz. And, in this range, noise on the inside of an aircraft is larger compared to when a flat plate wall having the same cross-sectional structure is employed. On the other hand, in a turboprop engine aircraft, as the principal frequency range of sound generated from a propeller is 200–500 Hz, a lowering of the TL of a cylindrical fuselage wall in these overlapping frequency ranges becomes a main cause of an increase in the sound transmitted to the inside of the aircraft as compared to when a flat plate wall is employed.

In the case where it is contemplated to improve this noise, it is almost impossible to widely change the configuration and material of the outside plate and it is difficult to make any contrivance in the outside plate because of the effect such would have on its being a strength holding member.

SUMMARY OF THE INVENTION

It is therefore one object of the present invention to provide an improved fuselage wall inner lining plate, which exhibits high sound transmission loss in a frequency range covering the frequencies of external noises, such as propeller sound, whereby external noises transmitted from the inside of the fuselage are low.

According to one feature of the present invention, there is provided a fuselage wall inner lining plate having a substantially cylindrical shape, in which a tensile rigidity in the circumferential direction is less than the tensile rigidity in the axial direction.

According to another feature of the present invention, there is provided the above-featured fuselage wall inner lining plate having a substantially cylindrical shape, in which the inner lining plate is provided with a large number of parallel crests extending in the axial direction.

According to still another feature of the present invention, there is provided the first-featured fuselage wall inner lining plate having a substantially cylindrical shape and made of fiber-reinforced plastics, in which weaving modes of fibers in the axial direction and in the circumferential direction are different so as to provide an anisotropic property in which tensile rigidity in the circumferential direction is less than that in the axial direction.

In general, the above-referred "ring frequency" $f_R$ of a cylinder is represented by the following equation:

$$f_R = \sqrt{E_y/\rho}/2\pi R$$

where
- $E_y$: Young's modulus of the cylinder material in the circumferential direction,
- $\rho$: density of the cylinder material, and
- $R$: radius of the cylinder.

According to the present invention, a tensile rigidity of a cylindrical inner lining plate in the circumferential direction is made less than that in the axial direction by providing a large number of corrugations such as wave-shaped corrugations defining crests extending parallel in the axial direction or by weaving fibers in the axial direction under a different mode than in the circumferential direction. Thus an equivalent $E_y/\rho$ value is small to correspondingly lower the ring frequency $f_R$ to one at which the TL becomes minimal and is set outside the range of principal frequencies of the propeller sound. Accordingly, the frequency range of the propeller sound will fall in a comparatively high TL region, whereby the amount of sound transmitted to the inside of the aircraft fuselage is correspondingly small.

The above-mentioned and other objects, features and advantages of the present invention will become more apparent by referring to the following description of preferred embodiments of the invention taken in conjunction with the accompanying drawings.

DETAILED DESCRIPTION OF THE PREFERRED EMBODIMENTS

Figure 1:
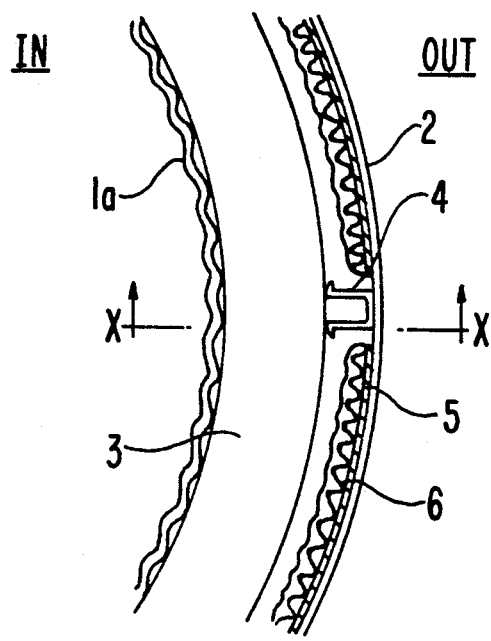
FIG. 1 is a cross-sectional view of part of a first preferred embodiment of the present invention.
Figure 2:
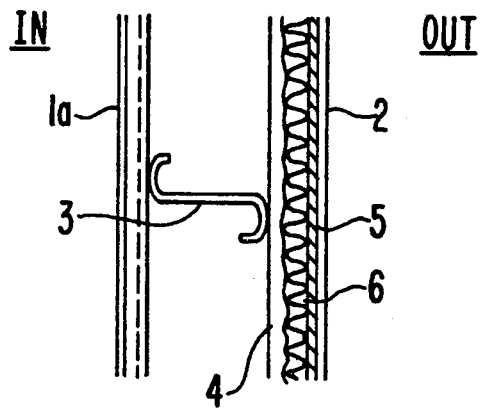
FIG. 2 is a partial cross-sectional view taken along line X—X in FIG. 1.

Now one preferred embodiment of a fuselage wall of an aircraft employing an inner lining plate according to the present invention will be described with reference to FIG. 1 showing a cross section perpendicular to a fuselage center line and to FIG. 2 showing a cross section taken along line X—X in FIG. 1. In these figures, reference numeral $1a$ designates an inner lining plate having a wave-shaped cross section and extending in the axial direction of the cylindrical fuselage wall. Reference symbols In and Out and reference numerals 2, 3, 4, 5 and 6 are used to designate elements of the fuselage wall in common with that in the prior art as described above, and so, further explanation thereof will be omitted here. The inner lining plate is mounted to a frame 3 by bolts.

Figure 3:
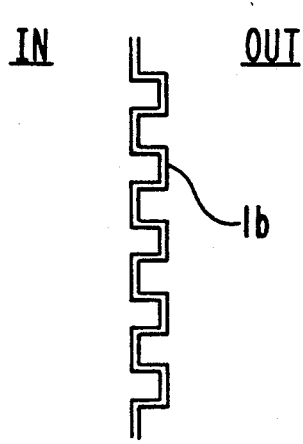
FIG. 3 is a cross-sectional view of an essential part of a second preferred embodiment of the present invention.
Figure 4:
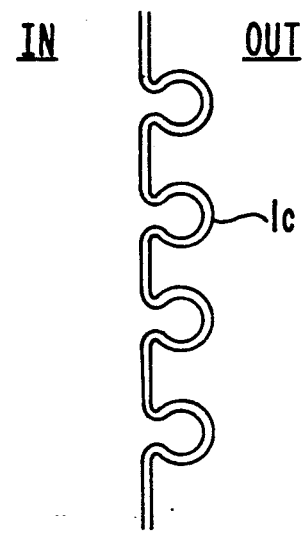
FIG. 4 is a cross-sectional view of an essential part of a third preferred embodiment of the present invention.
Figure 5:
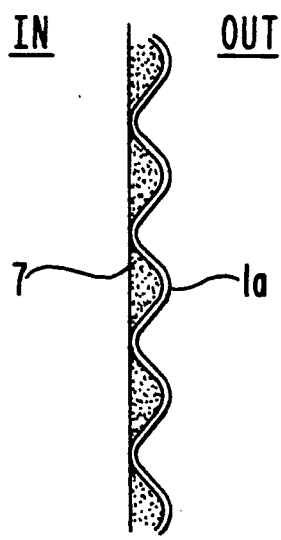
FIG. 5 is a cross-sectional view of an essential part of a fourth preferred embodiment of the present invention.
Figure 6:
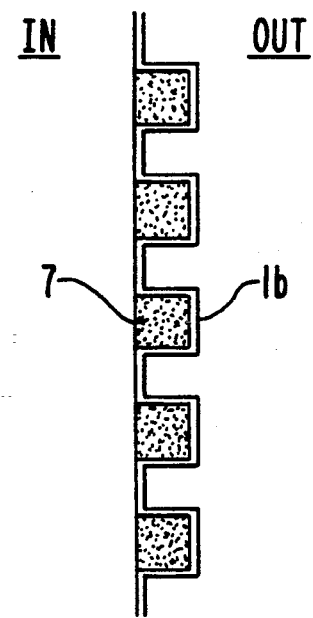
FIG. 6 is a cross-sectional view of an essential part of a fifth preferred embodiment of the present invention.

FIGS. 3 to 6 illustrate other preferred embodiments of the inner lining plate according to the present invention. FIG. 3 is a cross-sectional view of a second preferred embodiment of the inner lining plate $1b$ according to the present invention, having corrugations of a rectangular cross section. FIG. 4 is a cross-sectional view of a third preferred embodiment of the inner lining plate $1c$ according to the present invention, having corrugations of a Ω-shaped cross section. FIG. 5 is a cross-sectional view of a fourth preferred embodiment of the present invention, in which the inner lining plate $1a$ having a wave-shaped cross section has soft filler material 7 such as foamed urethane or the like disposed in the recesses on the inside of the inner lining plate in order to smoothen its inside surface. FIG. 6 is a cross-sectional view of a fifth preferred embodiment of the inner lining plate according to the present invention, in which the inner lining plate $1b$ having corrugations of a rectangular cross section also has soft filler material 7 similar to that described above disposed in the recesses on the inside of the inner lining plate.

Every one of the cylindrical inner lining plates according to these preferred embodiments has a comparatively low tensile rigidity in the circumferential direction owing to the provision of a large number of corrugations defining crests extending parallel to one another in the axial direction. Thus the ring frequency $f_R$ of these plates is one at which the TL is minimal and is outside the range of principal frequencies of sound of a propeller and, therefore, the frequency range of the propeller sound corresponds to a high TL region whereby transmitted sound, such as the sound of the propeller, is correspondingly low.

Now, in explaining these preferred embodiments, the first preferred embodiment, that is, the inner lining plate provided with a wave-shaped cross section shown in FIGS. 1 and 2, will be chosen as a representative example, its characteristics and the effects produced thereby will be described in the following.

In general, a ring frequency $f_R$ of a cylinder is represented by the following equation:

$$f_R = \sqrt{E_y/\rho}/2\pi R$$

where the respective symbols are defined as follows:
$E_y$: the Young's modulus of the cylinder material in the circumferential direction,
$\rho$: the density of the cylinder material,
$R$: the radius of the cylinder.

Figure 7A:
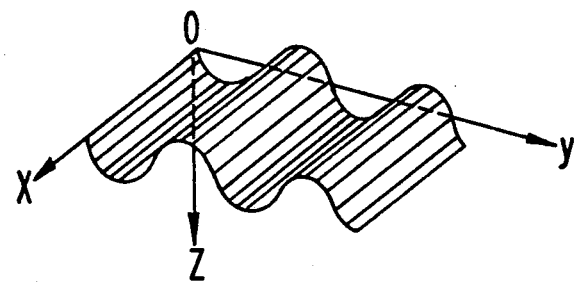
FIGS. 7(a)-7(c) are perspective, side and plan views of wave-shaped crests.
Figure 7B:
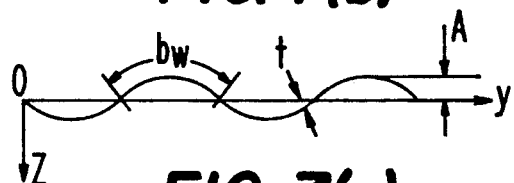
Figure 7C:
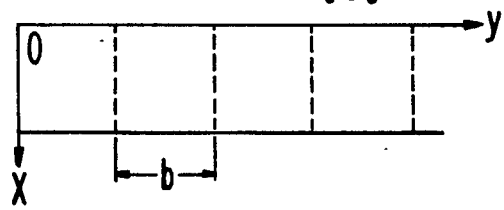

FIG. 7(a) is a perspective view of the corrugations constituting the wave-shaped cross section in the above-described first preferred embodiment, FIG. 7(b) is a front view of the same, and FIG. 7(c) is a plan view of the same. In these figures, the respective symbols are defined as follows:
t: thickness of a sheet of material,
b: half-wave-length of the wave,
$b_W$: true length of the material corresponding to a half-wave-length,
A: amplitude of the wave.

At this time, an equivalent Young's modulus $E_y^*$ in the circumferential direction and an equivalent density $\rho^*$ of the cylinder are respectively represented as follows:

$$E_y^* = E_y{}^{t3}(12I/b)^{-1}$$

$$\rho^* = \rho t (12I/b)^{-\frac{1}{3}} \times (b_W/b)^{\frac{4}{3}}$$

$$b_W/b = 1 + (\pi A/2b)^2$$

$$I/b = \frac{A^2 t}{2}\left[1 - \frac{0.81}{1 + 2.5(A/2b)^2}\right]$$

Here, as one practical example of the aforementioned inner lining plate having a wave-shaped cross section, a galvanized iron plate having dimensions of:
t = 0.6,
b = 38.1 and
A = 9 mm was employed. Also, for comparison, a flat galvanized iron plate having an equal surface density to the above-mentioned practical example and a dimension of:
t = 0.7 mm was employed, and both of the galvanized plates were formed into a cylinder having a radius of:
R = 2.36 m.

The above-described practical and comparative examples are listed in the tables and diagrams below as "Metal-1" and as "Metal-2", respectively.

Table-1 shows comparative measurements of the densities, Young's moduli and ring frequencies of the above-mentioned practical and comparative examples. From this table, it is seen that the $f_R$ of the cylinder having a wave-shaped cross section (Metal-1) is far smaller than the $f_R$ of the smooth cylinder made of a flat plate (Metal-2) and the value of the former is below the frequency range of the propeller sound (200–500 Hz).

TABLE 1

| Shape | Metal-1 Waved cylinder | Metal-2 Smooth cylinder |
|---|---|---|
| Plate thickness t (mm) | 0.6 | 0.7 |
| Density $\rho$ (kg/m$^3$) | 1580 | 8830 |
| Young's modulus in the lengthwise direction Ex*, Ex (N/m$^2$) | $2.1 \times 10^{11}$ | $2.1 \times 10^{11}$ |
| Young's modulus in the circumferential direction Ey*, Ey (N/m$^2$) | $7.6 \times 10^8$ | $2.1 \times 10^{11}$ |
| Ring frequency $f_R$ (Hz) | 45 | 329 |

Figure 8:
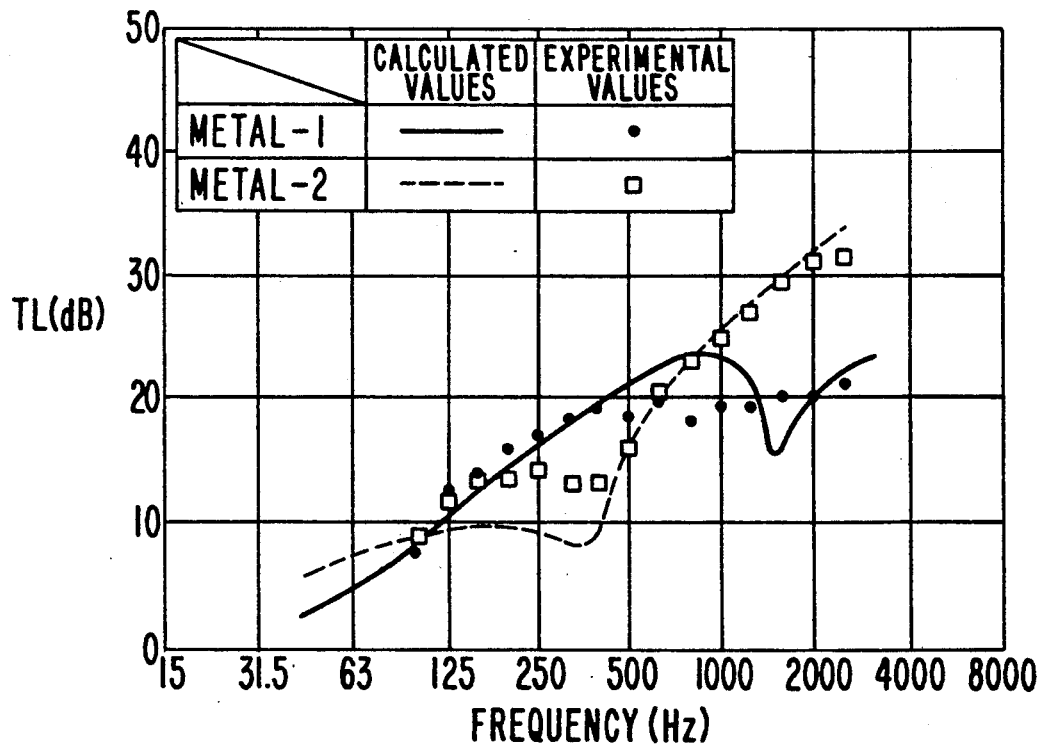
FIG. 8 is a diagram showing the effects of the wave-shaped crests.

The relationships of frequency vs. TL with respect to both calculated values and experimental values are shown in FIG. 8. Since the frequency range of the propeller sound falls in a comparatively high-TL region as a result of the fact that the minimum-TL region afforded by the present remains at low frequencies as shown in this figure, the amount of propeller sound which will be transmitted within the aircraft fuselage is less than that which would be transmitted if the flat galvanized plate were used. In the other preferred embodiments illustrated in FIGS. 3 to 6 similar effects were also observed.

It is to be noted that the inner lining plate provided with a large number of crests extending in parallel in the axial direction, is not limited to being metallic such as the galvanized iron plate mentioned above, but can be made of isotropic or anisotropic fiber-reinforced plastics providing similar effects and advantages.

Figure 9:
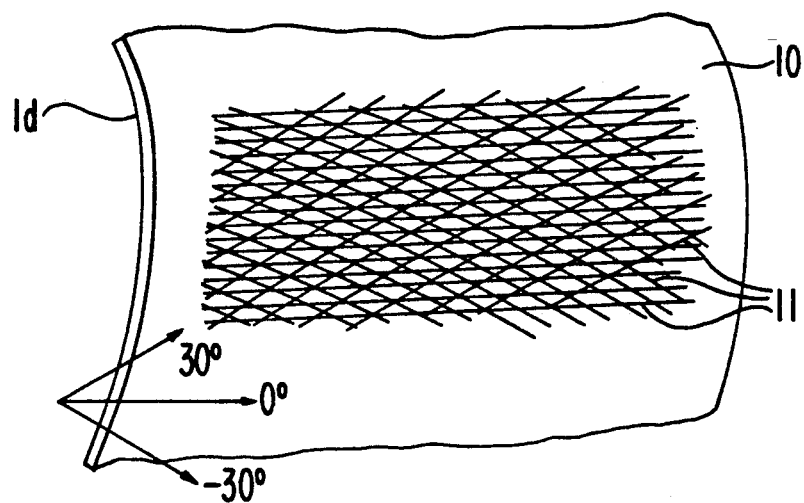
FIG. 9 is a perspective view of an essential part of a sixth preferred embodiment of the present invention.

FIG. 9 is a perspective view of a sixth preferred embodiment of the inner lining plate 1d according to the present invention. This inner lining plate 1d is made of fiber-reinforced plastics (FRP) of an anisotropic oblique lamination type. In this figure, arrow 0° represents the axial direction of the cylindrical fuselage, arrow 30° represents a direction along a curved surface of the plate at an angle of 30° with respect to the above-mentioned arrow 0°, and an arrow −30° represents a direction along the same curved surface at an angle of 30° in the opposite direction with respect to the above-mentioned arrow 0°. Reference numeral 10 designates resin such as epoxy resin, and numeral 11 designates reinforcement fibers such as glass fibers or the like. In this inner lining plate, a layer of parallel fibers extending in the direction of 0°, a layer of parallel fibers extending in the direction of 30° and a layer of parallel fibers extending in the direction of −30° are laminated by the resin. And, the number of layers extending in the 30° direction and the number of layers extending in the −30° direction are less than the number of layers extending in the 0° direction. In addition, the lamination is effected in such manner that the lamination patterns on the inner and outer sides are symmetrical to each other with respect to a plane of symmetry extending in the middle of the thickness of the inner lining plate.

Figure 10:
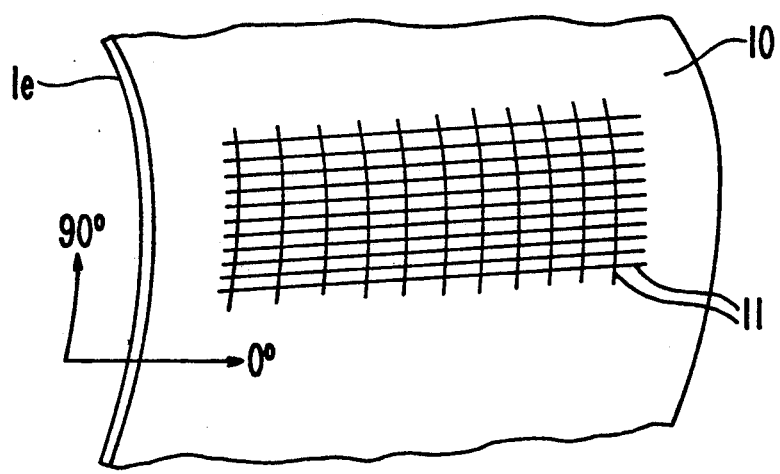
FIG. 10 is a perspective view of an essential part of a seventh preferred embodiment of the present invention.

FIG. 10 is a perspective view of a seventh preferred embodiment of the inner lining plate 1e according to the present invention. The inner lining plate 1e is made of fiber-reinforced plastics of an anisotropic perpendicular lamination type. In this figure, arrow 0° represents the axial direction of the cylindrical fuselage, and arrow 90° represents a circumferential direction of the same cylindrical fuselage, which is a direction perpendicular to the above-mentioned axial direction. Reference numeral 10 designates resin such as epoxy resin or the like, and numeral 11 designates reinforced fibers such as glass fibers. In this inner lining plate, a layer of parallel fibers extending in the direction of 0° and a layer of fibers extending in the direction of 90° are laminated to the plate via the resin. And, the number of layers extending in the direction of 90° is less than the number of layers extending in the direction of 0°. In addition, similarly to the sixth preferred embodiment, the lamination is effected in such a manner that the lamination patterns on the inner and outer sides are symmetrical to each other with respect to a plane of symmetry located in the middle of the thickness of the inner lining plate.

In the above-described cylindrical inner lining plate according to the sixth preferred embodiment and the seventh preferred embodiment, the tensile rigidity in the circumferential direction is comparatively low owing to the fact that the number of laminated layers having fibers extending in the axial direction is different from that having fiber extending in the other direction in the fiber-reinforced plastic. Thus, the ring frequency $f_R$ of these plates is one at which the TL is minimal and is outside the principal frequency range of the sound of a propeller or the like, whereby the sound transmitted by the above-mentioned propeller sound or the like is correspondingly low.

Next practical examples of these inner lining plates made of fiber-reinforced plastics and the effects produced thereby will be described.

Regarding the sixth preferred embodiment (FIG. 9: made of FRP of an anisotropic oblique laminated layer type), glass fibers were chosen as the reinforcement fibers, epoxy resin was chosen as the resin, and layers having a thickness of about 0.13 mm and consisting of fibers arrayed in parallel were sequentially laminated in directions selected in the following manner. The numerals below represent the angles of the arrows shown in FIG. 9:

(0, 0, 0, 30, −30, 0, 0, 0, 0, 0, 0, −30, 30, 0, 0, 0)

The laminate consists of 16 layers in total, and as the thickness of one layer is about 0.13 mm as described above, the lamination as a whole has a thickness of 2.1 mm. It is to be noted that the sequence of lamination may be such that the direction of the fibers will become symmetrical with respect to front and rear sides of a plane of symmetry located in the middle of the thickness of the laminated plate. This example is represented by FRP-1 in the table and diagram referred to later.

Regarding the seventh preferred embodiment (FIG. 10: made of FRP of an anisotropic perpendicular laminated layer type), glass fibers were chosen as the reinforcement fibers similarly to the above, and epoxy resin was chosen as the resin similarly to the above. And, layers each having the same structure and the same thickness as the above-described ones were sequentially laminated in directions selected in the following manner. The numerals below represent the angles of the arrows shown in FIG. 10:

(0, 0, 0, 90, 0, 0, 0, 90, 90, 0, 0, 0, 90, 0, 0, 0)

The lamination thus also consists of 16 layers in total similarly to the above, and the total thickness amounts to about 2.1 mm. Also the sequence of lamination may be such that the directions of fibers will become symmetrical with respect to front and rear sides of a plane of symmetry located in the middle of the thickness of the laminated plate. This example is represented by FRP-2 in the table and diagram referred to later.

As an example for comparing effects produced by the above-described both embodiments, a cylindrical inner lining plate of an isotropic perpendicular laminated layer type was formed in the following manner. That is, the kinds of fibers and resin, a thickness of one layer and the like were chosen so as to be the same as those of the above-described embodiments, and an isotropic property was given to the laminated plate by selecting the directions of fibers and the sequence of lamination in the following manner:

(0, 90, 0, 90, 0, 90, 0, 90, 90, 0, 90, 0, 90, 0, 90, 0)

In this comparative example, on each side of the plane of symmetry, fibers were alternately laminated in the direction of 0° and in the direction of 90° so that they were symmetrical with respect to the plane of symmetry, whereby an isotropic laminated plate was formed. The total thickness after lamination was the same as in the above-described embodiments. This comparative example is represented by FRP-3 in the table and diagram referred to later.

Table-2 shows comparative measurements of densities, Young's moduli and ring frequencies of the above-described embodiments and comparative example. From this table, it is seen that the $f_R$ of the cylinder made of anisotropic oblique laminated layers (FRP-1) and the cylinder made of anisotropic perpendicular laminated layers (FRP-2) are far smaller than the $f_R$ of the cylinder made of normal isotropic perpendicular laminated layers (FRP-3), and the values of the former are below the frequency range of the propeller sound (200–500 Hz).

TABLE 2

| Type of lamination | FRP-1 anisotropic oblique lamination | FRP-2 anisotropic perpendicular lamination | FRP-3 isotropic perpendicular lamination |
| --- | --- | --- | --- |
| Plate thickness t (mm) | 2.1 | 2.1 | 2.1 |
| Density $\rho$ (kg/m$^3$) | 1990 | 1970 | 1850 |
| Young's modulus in the lengthwise direction E*xEx (N/m$^2$) | $3.33 \times 10^{10}$ | $3.03 \times 10^{10}$ | $1.96 \times 10^{10}$ |
| Young's modulus in the circumferential direction E*yEy (N/m$^2$) | $1.10 \times 10^9$ | $6.07 \times 10^9$ | $1.96 \times 10^{10}$ |
| Ring frequency $f_R$ (Hz) | 50 | 118 | 219 |

Figure 11:
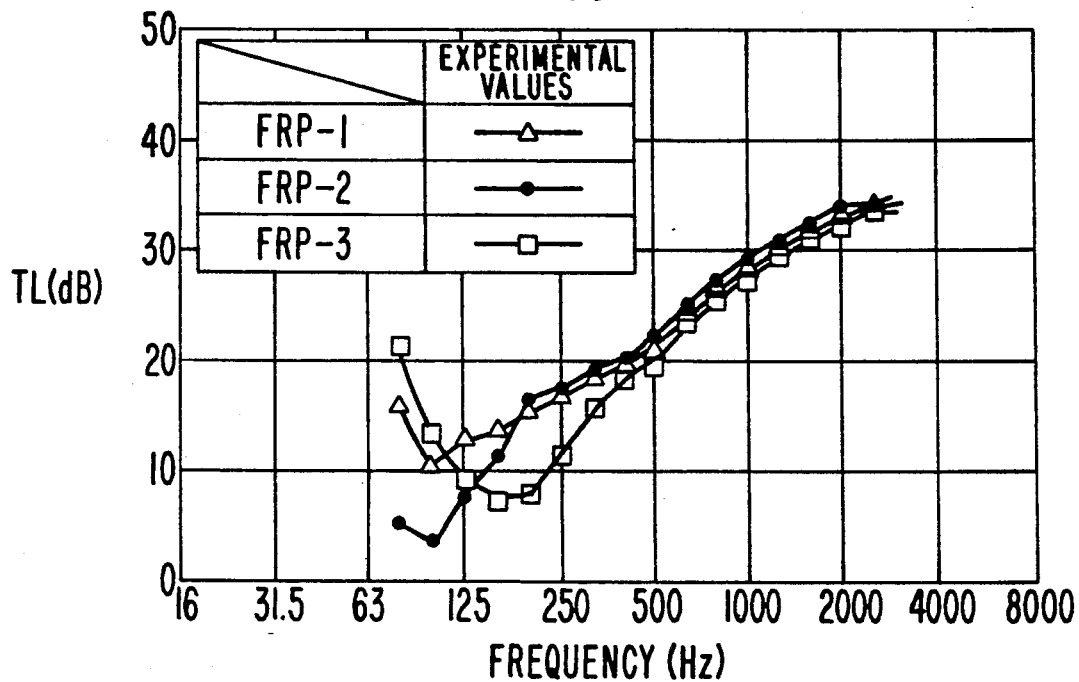
FIG. 11 is a diagram showing the effects of anisotropic FRP.
Figure 14:
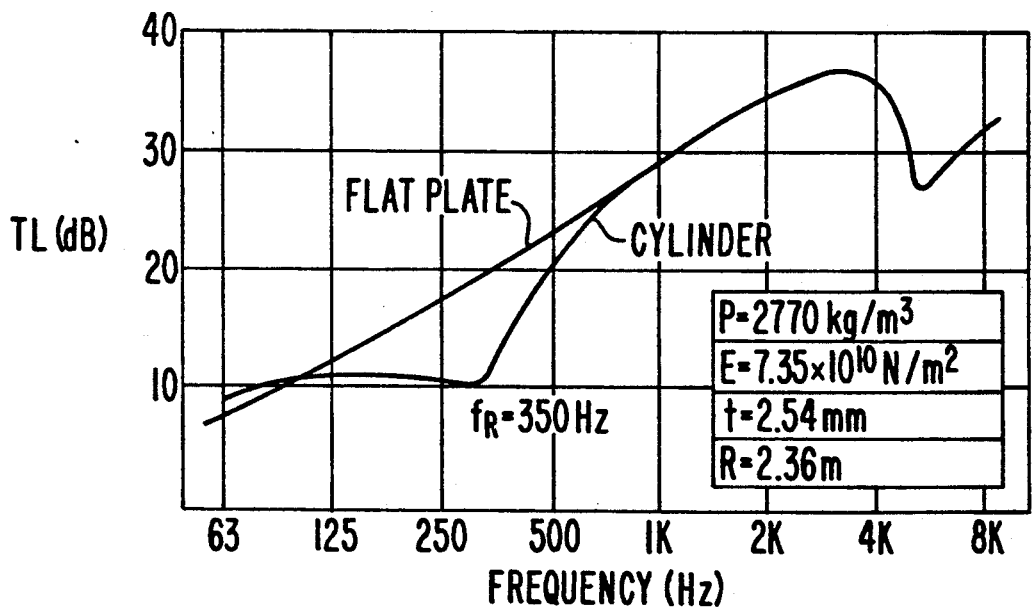
FIG. 14 is a diagram showing operational characteristics of a fuselage wall in the prior art.
Figure 12:
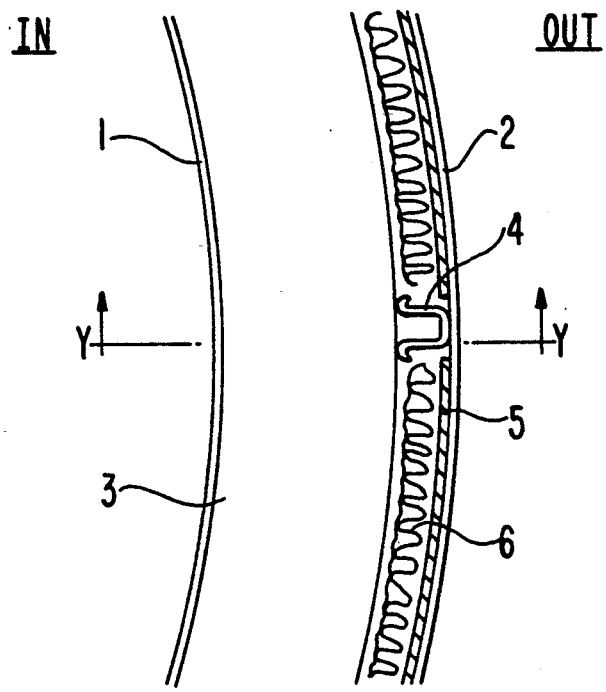
FIG. 12 is a cross-sectional view of part of a fuselage of an aircraft in the prior art.
Figure 13:
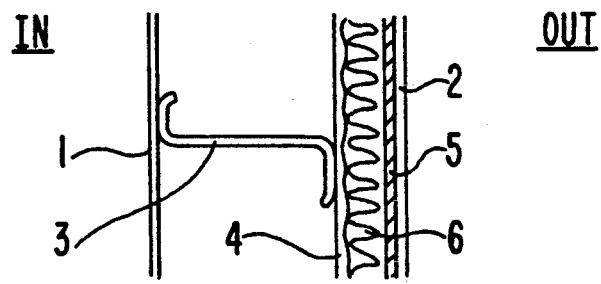
FIG. 13 is a partial cross-sectional view taken along line Y—Y in FIG. 12.

The relationships of frequency vs. TL with respect to the above-mentioned respective embodiments and comparative example obtained through experiments are shown in FIG. 11. Since the frequency range of the propeller sound or the like falls in a comparatively high-TL region as a result of the fact that the minimum-TL region afforded by the present invention remains at low frequencies as shown in this figure, the amount of the propeller sound which will be transmitted within an aircraft fuselage is less than that which would be transmitted if the comparative example were used.

As will be obvious from the detailed description above, the fuselage wall inner lining plate according to the present invention will transmit a low amount of propeller sound or the like through the fuselage wall, because the inner lining plate is provided with a large number of crests extending parallel to one another in the axial direction, or in the case of an inner lining plate made of fiber reinforced plastics, because the weaving modes of fibers in the axial direction and the circumferential direction are different.

Since many changes and modifications can be made in the above-described embodiments without departing from the spirit of the present invention, it is intended that all matter contained in the above description and illustrated in the accompanying drawings shall be interpreted to be illustrative and not in a limiting sense.

What is claimed is:

1. A fuselage wall inner lining comprising a plate of a stiff material having a substantially cylindrical shape, said plate having a tensile rigidity in the direction of the circumferential dimension thereof that is less than the tensile rigidity in the direction of the axial dimension thereof, and said plate having a ring frequency, where transmission loss of the plate becomes minimal, of less than 200 Hz, wherein said ring frequency is represented by $$f_R = \sqrt{Ey/\rho}/2\pi R,$$

Ey being the tensile rigidity of said plate in the direction of the axial dimension thereof, $\rho$ being the density of the material of said plate, and R being the radius of said plate.

2. A fuselage inner lining comprising a plate of a stiff material having a substantially cylindrical shape, and a plurality of corrugations, the crests of all of said corrugations extending parallel to one another in the direction of the axial dimension of the plate such that said corrugations provide the plate with a tensile rigidity in the direction of the circumferential dimension thereof that is less than the tensile rigidity in the direction of the axial dimension thereof, and said plate having a ring frequency, where transmission loss of the plate becomes minimal, of less than 200 Hz, wherein said ring frequency is represented by $$f_R = \sqrt{Ey/\rho}/2\pi R,$$

Ey being the tensile rigidity of said plate in the direction of the axial dimension thereof, $\rho$ being the density of the material of said plate, and R being the radius of said plate.

3. A fuselage inner lining comprising a substantially cylindrical plate of fiber-reinforced plastic, some of the fibers of the fiber-reinforced plastic of the plate extending parallel to another in the direction of the axial dimension of the plate and others of the fibers extending at an angle to the direction of the axial dimension of the plate, the arrangement of said fibers being such as to provide an anisotropic property to the plate in which the tensile rigidity of the plate in the direction of the circumferential dimension thereof is less than the tensile rigidity of the plate in the direction of the axial dimension thereof, and said plate having a ring frequency, where transmission loss of the plate becomes minimal, of less than 200 Hz, wherein said ring frequency is represented by $$f_R = \sqrt{Ey/\rho}/2\pi R,$$

Ey being the tensile rigidity of said plate in the direction of the axial dimension thereof, $\rho$ being the density of the material of said plate, and R being the radius of said plate.

4. In an aircraft powered by a propelling device generating noise in a principal frequency range, an improved fuselage comprising:
- a fuselage wall outside plate having a cylindrical shape and forming the outermost part of the fuselage;
- a fuselage wall inside plate of a stiff material having a substantially cylindrical shape, said inside plate located radially inwardly of said outside plate and forming the innermost part of the fuselage,
- said fuselage wall inside plate also having a tensile rigidity in the direction of the circumferential dimension thereof that is less than the tensile rigidity in the direction of the axial dimension thereof, and
- said fuselage wall inside plate having a ring frequency, where transmission loss of the inside plate becomes minimal, which is less than said principal frequency range of the noise generated by the propelling device, wherein said ring frequency is represented by $$f_R = \sqrt{Ey/\rho}/2\rho R,$$

Ey being the tensile rigidity of said inside plate in the direction of the axial dimension thereof, $\rho$ being the density of the material of said inside plate, and R being the radius of said inside plate; and
- a frame interposed between and connecting said inside and said outside plates.

5. In an aircraft powered by a propelling device generating noise in a principal frequency range, an improved fuselage comprising:
- a fuselage wall outside plate having a cylindrical shape and forming the outermost part of the fuselage;
- a fuselage wall inside plate of a stiff material having a substantially cylindrical shape, said inside plate located radially inwardly of said outside plate and forming the innermost part of the fuselage,
- said fuselage wall inside plate also having a plurality of corrugations, the crests of all of the corrugations of the inside plate extending parallel to one another in the direction of the axial dimension of the plate such that the corrugations provide said inside plate with a tensile rigidity in the direction of the circumferential dimension thereof that is less than the tensile rigidity in the direction of the axial dimension thereof, and
- said fuselage wall inside plate having a ring frequency, where transmission loss of the inside plate becomes minimal, which is less than said principal frequency range of the noise generated by the propelling device, wherein said ring frequency is represented by $$f_R = \sqrt{Ey/\rho}/2\rho R,$$

Ey being the tensile rigidity of said inside plate in the direction of the axial dimension thereof, $\rho$ being the density of the material of said inside plate, and R being the radius of said inside plate; and
- a frame interposed between and connecting said inside and said outside plates.

6. In an aircraft powered by a propelling device generating noise in a principal frequency range, an improved fuselage comprising:
- a fuselage wall outside plate having a cylindrical shape and forming the outermost part of the fuselage;
- a substantially cylindrical fuselage wall inside plate of fiber reinforced plastic, said inside plate located radially inwardly of said outside plate and forming the innermost part of the fuselage;
- some of the fibers of the fiber-reinforced plate of the inside plate extending parallel to one another in the direction of the axial dimension of the inside plate and others of the fibers extending at an angle to the direction of the axial dimension of the inside plate, the arrangement of said fibers being such as to provide an anisotropic property to the plate in which the tensile rigidity of the plate in the direction of the circumferential dimension thereof is less than the tensile rigidity of the plate in the direction of the axial dimension thereof and
- said fuselage wall inside plate having a ring frequency, where transmission loss of the inside plate becomes minimal, which is less than said principal frequency range of the noise generated by the propelling device, wherein said ring frequency is represented by $$f_R = \sqrt{Ey/\rho}/2\rho R,$$

Ey being the tensile rigidity of said inside plate in the direction of the axial dimension thereof, $\rho$ being the density of the material of said inside plate, and R being the radius of said inside plate; and
- a frame interposed between and connecting said inside and said outside plates.

* * * * *